(12) United States Patent
Delahunty

(10) Patent No.: US 6,275,236 B1
(45) Date of Patent: *Aug. 14, 2001

(54) SYSTEM AND METHOD FOR DISPLAYING TRACKED OBJECTS ON A DISPLAY DEVICE

(75) Inventor: Stephen G. Delahunty, Bedford, NH (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,519

(22) Filed: Jan. 24, 1997

(51) Int. Cl.[7] .................................................. G06T 11/60
(52) U.S. Cl. ............................................ 345/435; 345/473
(58) Field of Search ..................................... 345/435, 473

(56) References Cited

U.S. PATENT DOCUMENTS

| | | | |
|---|---|---|---|
| 5,706,417 | * | 1/1998 | Adelson ................................. 345/435 |
| 5,940,538 | * | 8/1999 | Spiegel et al. ........................ 382/236 |
| 5,949,432 | * | 9/1999 | Gough et al. .......................... 345/435 |

OTHER PUBLICATIONS

Lasseter et al.; Principle of Traditional; Computer Graphic vol. 21; No. 4; pp. 35–44, Jul. 1987.*
Payson, Christopher J. et al., "Hardware Accelerators for Bitonal Image Processing", Digital Technical Journal, vol. 3, No. 4, Fall 1991, pp. 9–35.

* cited by examiner

*Primary Examiner*—Mark Zimmerman
*Assistant Examiner*—Huedung X. Cao
(74) *Attorney, Agent, or Firm*—Cesari and McKenna, LLP

(57) ABSTRACT

A system and method for displaying tracked objects on a display is disclosed The method includes writing current location and a number of previous locations of the object with pixel values having non-zero overlay data. The system writes an ordered set of codes into the pixel values for the current location and indicates the set to a driver. The driver uses the overlay data displaying the current and several previous object locations sequentially in order of the set. The displayed locations may be displayed by unmasking the overlay data. The codes may be index values in the pixel values indicating corresponding entries in a pixel interpretation table. A driver may modify mask values in the table entries to mask or unmask overlay data in associated pixel values. The system can display many tracked objects simultaneously, without high CPU utilization or a program to draw, erase, and redraw tracked objects.

26 Claims, 9 Drawing Sheets

SYSTEM AND METHOD FOR DISPLAYING TRACKED OBJECTS ON A DISPLAY DEVICE

FIELD OF THE INVENTION

The disclosed invention relates generally to computer graphics display systems, and more specifically to a system for displaying tracked objects on a computer operated display device.

BACKGROUND

In computer graphics display systems, elements displayed within a particular display image are referred to as display objects, or objects. In many computer graphics displays, it is required to provide tracked objects. A tracked object is an object which is displayed so as to reflect the movement of the object through the display space reflected by the display image.

For example, a tracked moving object may be displayed by displaying the current position of the object 100% of the time, while also displaying a number of previous positions of the object periodically in ascending sequential (temporal) order. The resulting effect is similar to that of a flashing detour sign as is typically used to direct automobile drivers toward a particular direction. The flashing detour sign flashes sequentially in the direction of the detour.

Tracked objects are useful in many graphics system applications, for example radar displays. The tracked object on a radar display can be used to show an observing radar officer the path of a moving object detected by the radar and its approximate speed.

In existing systems which provide tracked object displays, the computational resources required for these operations are dependent on the number of tracked objects within the screen display at any given time. This is because existing application programs have typically done the tracking directly through many layers of software within the existing system. Specifically, in such systems, in order to display a tracked object the application must draw, erase, and re-draw the object in its current and previous location in order to make it appear tracked.

Current systems are required to simultaneously display thousands of tracked objects. Such systems often must use 100% of their CPU power in order to maintain the large number of tracked objects on their displays. This high utilization of the CPU is undesirable and unacceptable where computational resources must be shared by multiple applications.

Thus there is required a new computer graphics system for displaying tracked objects which is capable of displaying large numbers of tracked objects simultaneously, which does not require high utilization of the CPU, and which preferably does not require an application software program to draw, erase, and redraw each tracked object.

SUMMARY OF THE INVENTION

A new system and method for displaying blinking or tracked objects on a computer display device is disclosed. The disclosed method for displaying a tracked object includes writing a current location and a predetermined number of previous locations of a tracked object with pixel values having non-zero overlay data. The new system writes a selected one of a predetermined ordered set of type codes into the pixel values for the current location. The system indicates to a device driver the selected one of the set of type codes. The device driver uses the overlay data in the pixel values for the current and previous locations to display the current locations and predetermined number of previous locations of the tracked object sequentially in order of the predetermined set of type codes.

In an example embodiment, the current location and sequentially displayed previous locations are displayed by unmasking the overlay data in the corresponding pixel values. Further in an example embodiment, the type codes are index values in the pixel values indicating corresponding entries in a pixel interpretation table. Further in an example embodiment, a device driver modifies overlay mask values in the pixel interpretation table entries to mask or unmask overlay data in associated pixel values.

Thus there is provided a new computer graphics system including a new method for displaying tracked objects and which is capable of displaying large numbers of tracked objects simultaneously, which does not require high utilization of the CPU, and which does not require an application software program to draw, erase, and redraw each tracked object.

BRIEF DESCRIPTION OF THE DRAWINGS

The foregoing features and other aspects of the invention will now become apparent when the accompanying description is read in conjunction with the following drawings in which.

DETAILED DESCRIPTION OF THE PREFERRED EMBODIMENTS

Figure 1:
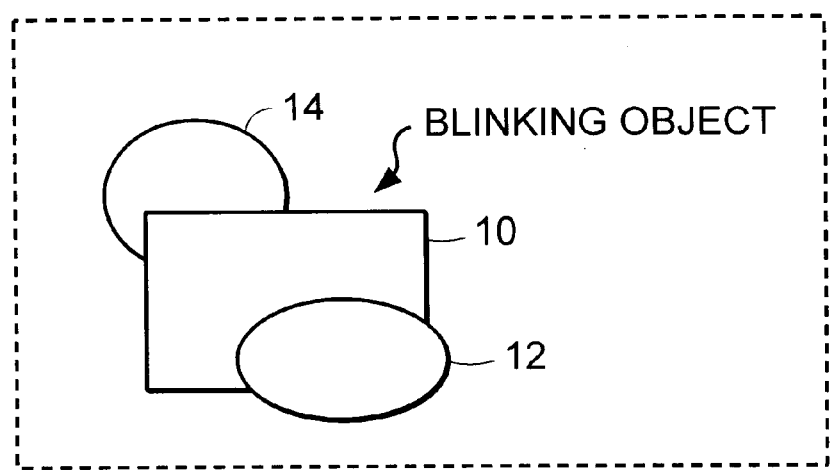
FIG. 1 shows an example embodiment of a graphics display on a display device including a visible blinking object.
Figure 2:
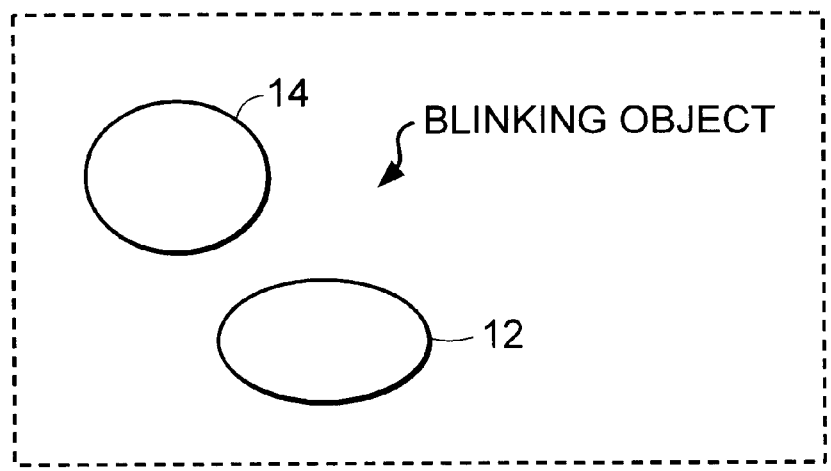
FIG. 2 shows an example embodiment of a graphics display on a graphics display device including a blinking object that is hidden.

FIGS. 1 and 2 show screen displays exemplifying a blinking object as produced by an example embodiment of the present system. FIG. 1 shows an example embodiment having a visible blinking object. In FIG. 1 there are shown three screen objects, specifically a visible blinking object shown as rectangle 10, a foreground object shown as oval 12, and a background object shown as circle 14. In FIG. 2, the blinking object 10 is hidden. Accordingly in FIG. 2, the circle 14 is completely visible. As shown in FIG. 1 and FIG.

2 stacking order is maintained by the disclosed system with respect to blinking objects. A blinking object such as the rectangle 10, may be drawn on top of, or underneath another object. When the blinking object 10 is turned off, also referred to as being "hidden" or "transparent", areas and objects underneath the blinking object are made visible. When the blinking object is turned on, also referred to as being made "visible", any object underneath the blinking object will be obscured while objects above the blinking object obscure the blinking object.

When an object is blinked on a display, this is accomplished by alternating display of the object between making it visible and making it transparent. In an example embodiment of the present system, during a visible or "on" phase of operation, any objects beneath the blinking object will be obscured while objects above the blinking will remain visible. During a transparent or "off" phase of operation, objects underneath the blinking object will be visible. In an example embodiment, the system provides two phases. Each blinking object is associated with one of the two system phases for the "on" phase of operation for that blinking object, and with the other system phase for its "off" phase of operation.

In another aspect of an example embodiment of the present system, objects are made to blink by alternating the display of an object between two colors. For example, an application may define an object to be displayed as red during the "on" phase and blue during the "off" phase. When displayed in this manner, the blinking object cannot be made transparent. In this example embodiment, any objects underneath the blinking object are obscured 100% of the time.

In FIGS. 3A–3L, there is shown a series of displays of a tracked object as provided by the present system. In the example embodiment of FIGS. 3A–3L, the application program draws pixels on the screen, indicates how many non-current (or "history") pixels are to be displayed, and further indicates a display frequency for history pixels. The history pixels for a tracked object are those pixels displaying previous positions of the tracked object. In an example default configuration, history pixels within a tracked object are displayed for one time period referred to as a display "frame", then made transparent for three immediately subsequent frames. Further in an example default configuration, the pixels within a current position of the tracked object are displayed 100% of the time. A person skilled in the art will recognize that the disclosed system further provides the capability for an application to change these example parameters.

History pixel values for a tracked object are maintained using what is referred to as overlay data within each pixel, in combination with overlay mask values within the pixel interpretation table entries. Each history pixel is within an area of Video RAM (VRAM) associated with a non-current location of the tracked object in the display space. Overlay data is stored within a field of pixel data that is outside the color information for the current and non-current locations of the tracked object. As a result, tracked pixels may be drawn on the screen using overlay data without disturbing any non-overlay pixel data such as that representing blinking objects. When a tracked pixel is made transparent, the non-overlay pixel data "underneath" the tracked pixel data in the overlay data becomes visible. This feature of the present system is extremely valuable to such application environments as air traffic control (ATC) or other applications which use some form of radar data to track targets, which require multiple layers of display information.

Figure 3A:
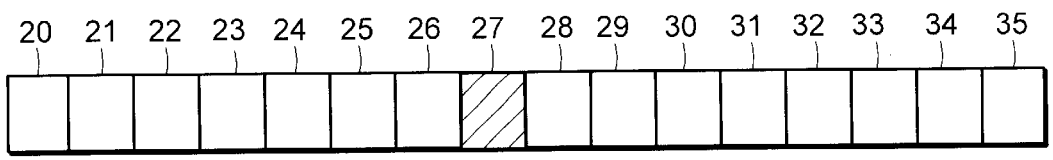
FIGS. 3A through 3L show an example embodiment of a tracked object displayed on a graphics display device.

FIGS. 3A–3F show a tracked object as provided by an example embodiment of the disclosed system. In FIG. 3A, a set of pixels, numbered 20–35, are shown at a time $t_0$. At time $t_0$ the current position of the tracked object includes pixel 27. Accordingly, pixel 27 is shown set to the color of the tracked object in FIG. 3A. In an example embodiment of the invention, the pixels in the current position of a tracked object are always displayed.

Figure 3B:
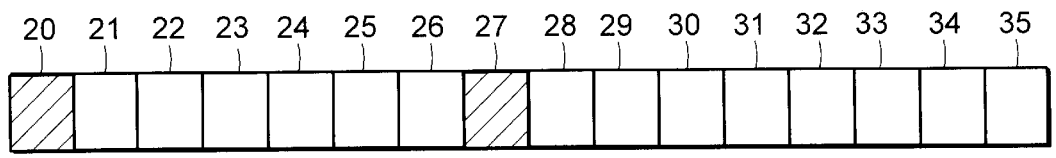

In FIG. 3B, the pixels 20–35 are shown at a time t1. At time $t_1$, the current position of the tracked object has not changed. Accordingly, pixel 27 remains set. Further at time $t_1$ as shown in FIG. 3B, a history pixel is displayed, for example pixel 20.

Figure 3C:
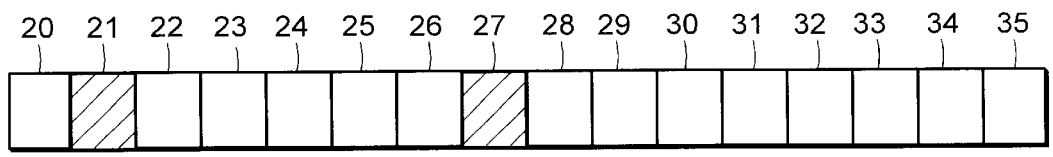
Figure 3D:
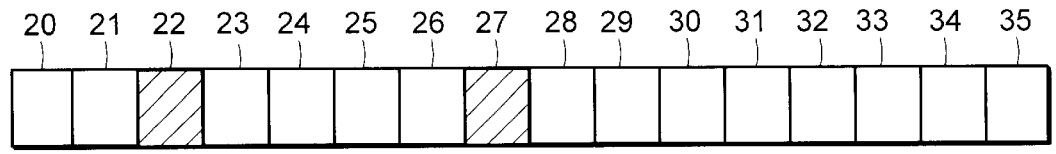
Figure 3E:
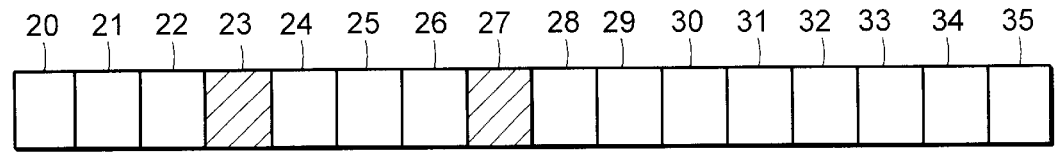
Figure 3F:
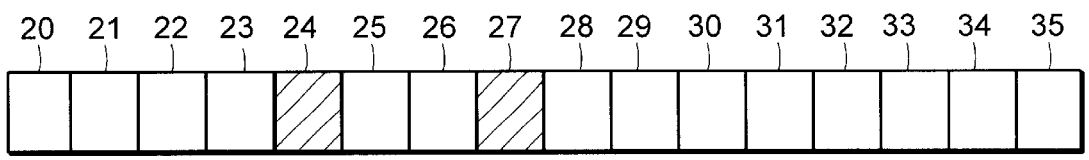
Figure 3G:
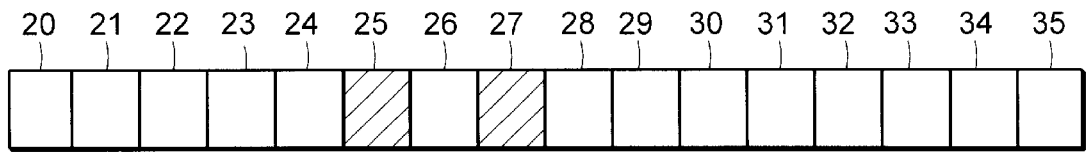
Figure 3H:
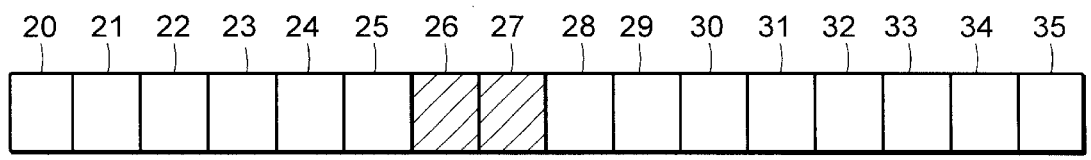
Figure 3I:
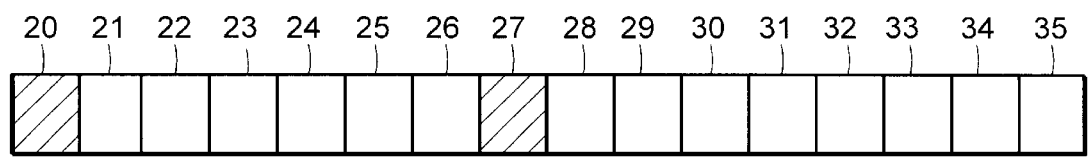

In FIG. 3C, the pixels 20–35 are shown at a time t2. At time $t_2$, the tracked object has not moved, and accordingly pixel 27 remains set. Also at time $t_2$ as shown in FIG. 3C, a history pixel 21 is set. Similarly, in FIGS. 3D through 3H, the tracked object position has not changed. Accordingly, in FIGS. 3D to 3H pixel 27 remains set. Further in FIGS. 3D through 3H, one of history pixels 21 through 26 is set. In the example embodiment of FIGS. 3A through 3L, the number of history pixels is shown as 7, representing a display of the tracked object at its current position and at seven previous positions. One skilled in the art will recognize that the disclosed system is applicable where some other number of previous positions are included in the display of the tracked object.

Also in the example of FIGS. 3A–3L, the history pixels are shown displayed sequentially beginning with the least recent previous position and progressing towards the most recent previous position, then beginning again with the least recent previous position. A person skilled in the art will recognize that other sequences of display of history pixels in previous positions of a tracked object are possible consistent with principles of the invention.

Figure 3J:
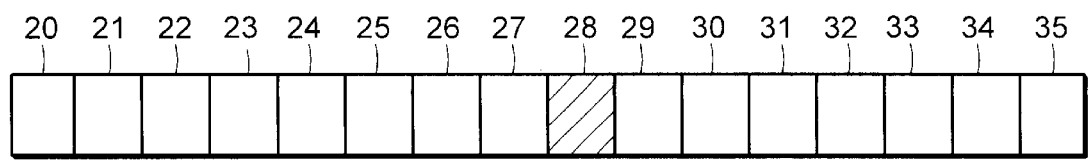

At FIG. 3J, the tracked object has changed position from its position in FIGS. 3A through 3I. As shown in FIG. 3J, the new current position of the tracked object includes pixel 28, which accordingly is set to the color of the tracked object. The history pixel for the tracked object as shown in FIGS. 3J–3L are therefore pixels 21–27.

Figure 3K:
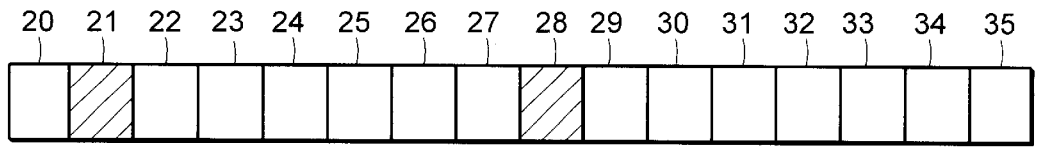
Figure 3L:
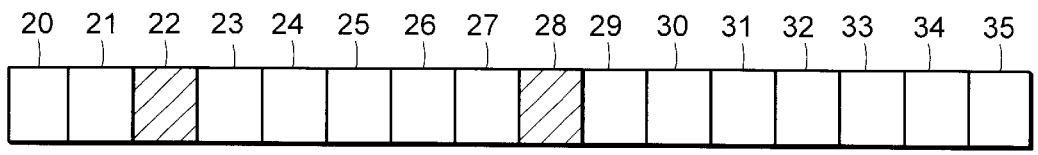

In FIG. 3K, the least recent history pixel, pixel 21, is set. In FIG. 3L, the current position pixel 28 is set, pixel 21 has been cleared, and the next least recent history pixel, in this case pixel 22, has been set. In this way, it is shown that the history pixels for the tracked object are displayed sequentially, from least recent previous position to most recent previous position.

Figure 4:
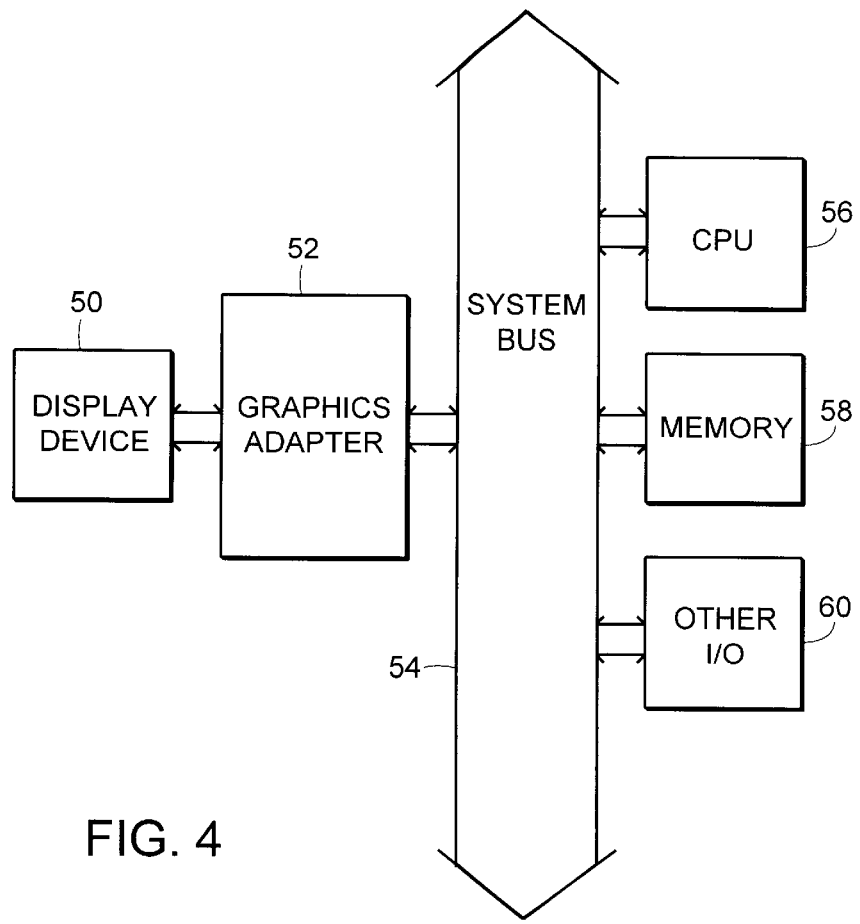
FIG. 4 shows an example embodiment of a graphics display system.

FIG. 4 shows an example embodiment of the present system,, including a display device 50, coupled with a graphics adapter 52, which is in turn coupled with a system bus 54. Also coupled to the system bus 54 is shown a CPU 56, memory 58, and other I/O devices 60. During operation of the elements shown in FIG. 4, blinking and tracked objects are displayed on the display device 50 in response to elements of the present invention within the graphics adapter 52 and the memory 58 and responsive to the CPU 56. In an example embodiment, the elements of the present system are implemented in software executing on the CPU 56 and stored in the memory 58, while operating on data structures stored within the graphics adapter 52.

Figure 5:
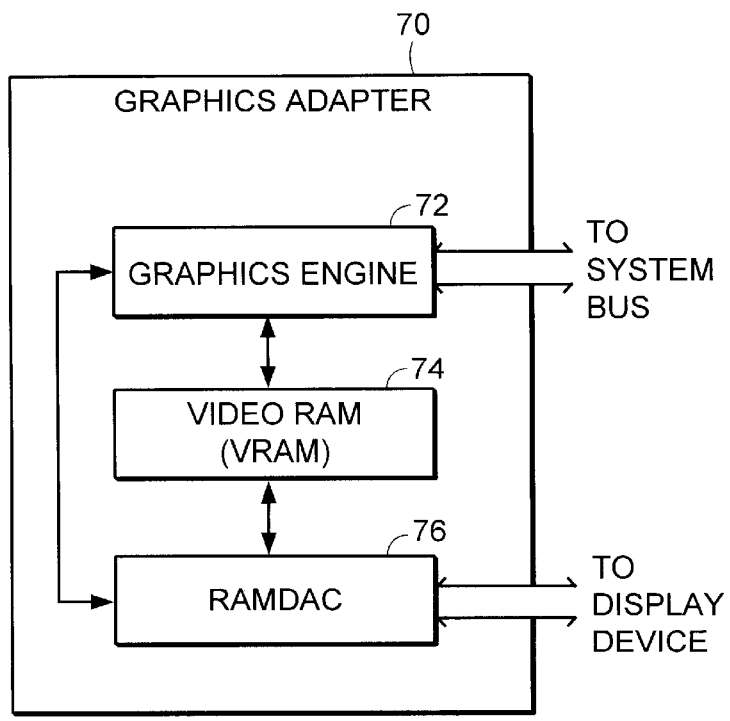
FIG. 5 shows an example embodiment of elements within a graphics adapter.

FIG. 5 shows an example embodiment of a graphics adapter 70 such as the graphics adapter 52 shown in FIG. 4. The graphics adapter 70 in FIG. 5 is shown including a graphics engine 72 coupled to a system bus such as the system bus 54 as shown in FIG. 4. The graphics engine 72 is shown coupled with a Video RAM 74 (VRAM) as well as a RAMDAC 76. The RAMDAC 76 ("Random-Access Memory Digital Analog Converter") is also coupled with the VRAM 74 and a display device such as the display device 50 shown in FIG. 4.

During operation of the elements in the example embodiment shown in FIG. 5, the graphics engine 72 interfaces the graphics adapter 70 to the system bus, accelerates drawing, and provides access to the VRAM 74. The graphics engine 7C is, for example, software or firmware executing on a microprocessor or some combination of software, firmware, and hardware logic. The RAMDAC 76 reads pixel data out of the VRAM 74 and converts the pixel data into analog signals. These analog signals are then sent to electron guns within the display device such as display device 50 as shown in FIG. 4.

Figure 6:
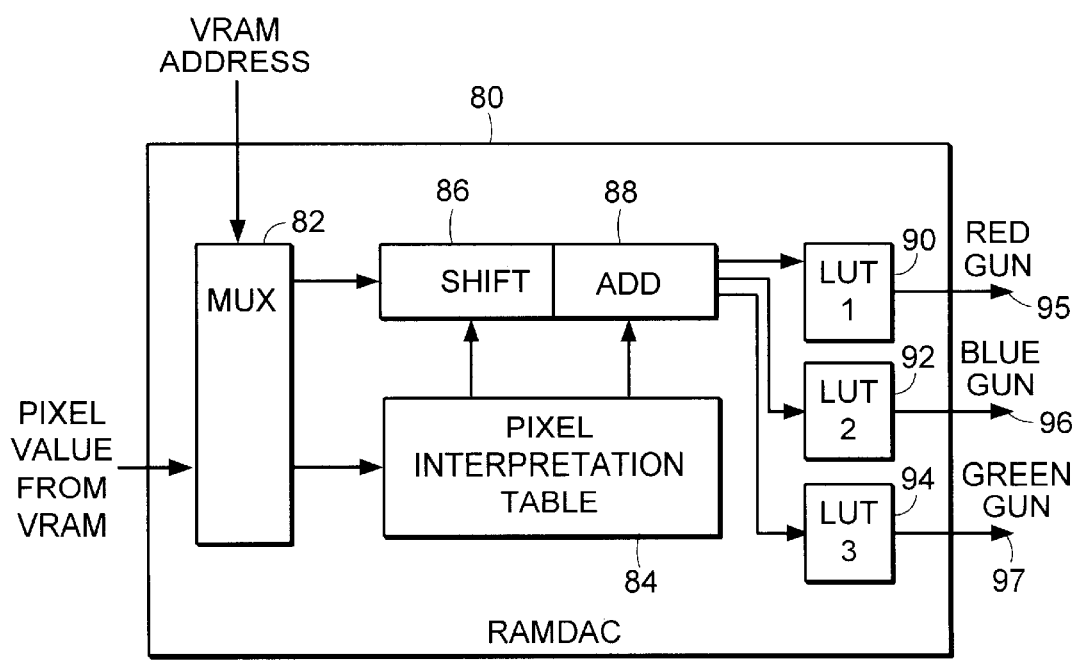
FIG. 6 shows an example embodiment of elements within a RAMDAC.

FIG. 6 shows an example embodiment of a RAMDAC 80 such as the RAMDAC 76 shown in FIG. 5. The example RAMDAC 80 in FIG. 6 provides functionality similar to that provided by the Brooktree® BT463 RAMDAC, a commercially available device. The example RAMDAC 80 shown in FIG. 6 includes a multiplexer 82 for selecting a pixel value from a VRAM such as the VRAM 74 in FIG. 5, responsive to a VRAM address. A first portion of the output of the multiplexer 82 is further coupled with a shifter/adder circuit comprised of shifter 86 and adder 88. A second portion of the output of the multiplexer 82 is coupled to an index input of a pixel interpretation table 84. The pixel interpretation table 84 is sometimes referred to as a "pixel tag" or "window tag" table. The corresponding table in the Brooktree® BT463 RAMDAC is referred to as the "window type" table. The shifter/adder circuit inputs are coupled with control lines from the pixel interpretation table 84.

Further with regard to the elements shown in FIG. 6, the output of the adder 88 is a set of indexes into color look-up table 1 (LUT1) 90, color look-up table 2 (LUT2) 92, and color look-up table 3 (LUT3) 94. Color look-up table 1 90 (LUT1) is for example coupled with a red color gun within a display device. Color look-up table 2 92 (LUT2) is for example coupled with a blue color gun within the display device. And color look-up table 3 94 (LUT3) is for example coupled with a green color gun in the display device. The specific values loaded into LUT1, LUT2 and LUT3 are predetermined and may be loaded independently of the operation of the disclosed system.

During operation of the elements shown in FIG. 6, separate portions of pixel values are passed through the multiplexer 82 to the inputs of the shifter/adder circuit and the index inputs of the pixel interpretation table 84. A predetermined field within each pixel value is thus used to index into the pixel interpretation table 84, to find a pixel interpretation table entry associated with that pixel. The values of fields within the pixel interpretation table entry are used to control the shifter 86 and adder 88, and to interpret other fields within the pixel value. Responsive to the contents of fields in the associated pixel interpretation table entry and information in the pixel value, an address (referred to for purposes of example herein as a "color address") of a location within the color look-up table is generated for each of the color guns. For example, a first address of an entry written LUT1 is generated. The LUT1 entry contains a digital value that is converted by a digital to analog converter (DAC) to an analog signal which is passed to the red color gun. Addresses of entries within LUT2 and LUT3 are similarly generated to obtain digital values that are converted to analog voltages to be passed to the green and blue color guns. The analog values are passed to the three color guns (95, 96, and 97) in order to produce the graphics display on the display device.

For example, the value of a shift field in the associated pixel interpretation table entry indicates a bit position of color information within the pixel. The shift field value is used by the shifter 86 to move the color information into the least significant bit positions which are used to address the appropriate color look-up table. A value of a start address field in the associated pixel interpretation table entry is then passed to the adder 88 and added to the color information for the pixel in order to select among potentially multiple color palettes (AKA "color maps") stored in the color look-up tables.

Figure 7:
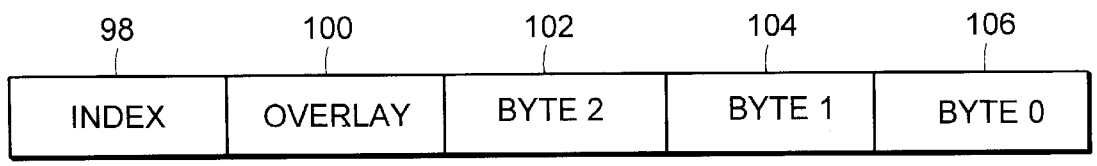
FIG. 7 shows an example embodiment of a pixel data format.

FIG. 7 shows an example embodiment of the format of a pixel value within VRAM. In the example embodiment of FIG. 7, there is shown an index field 98, an overlay field 100, three bytes of color information shown as byte 2 102, byte 1 104, and byte 0 106. During operation of the elements shown in FIG. 7, the contents of the index field 98 are used by the RAMDAC to interpret the remaining fields of pixel data. The value of the index field 98 is for example within a range of possible indexes into a pixel interpretation table. For example, where the pixel interpretation table of an example embodiment includes 16 entries, the value of the index field 98 is within a range of zero to 15. The pixel interpretation table entry indexed by the value of the index field 98 is used by the RAMDAC to interpret the rest of the pixel value.

Figure 8A:
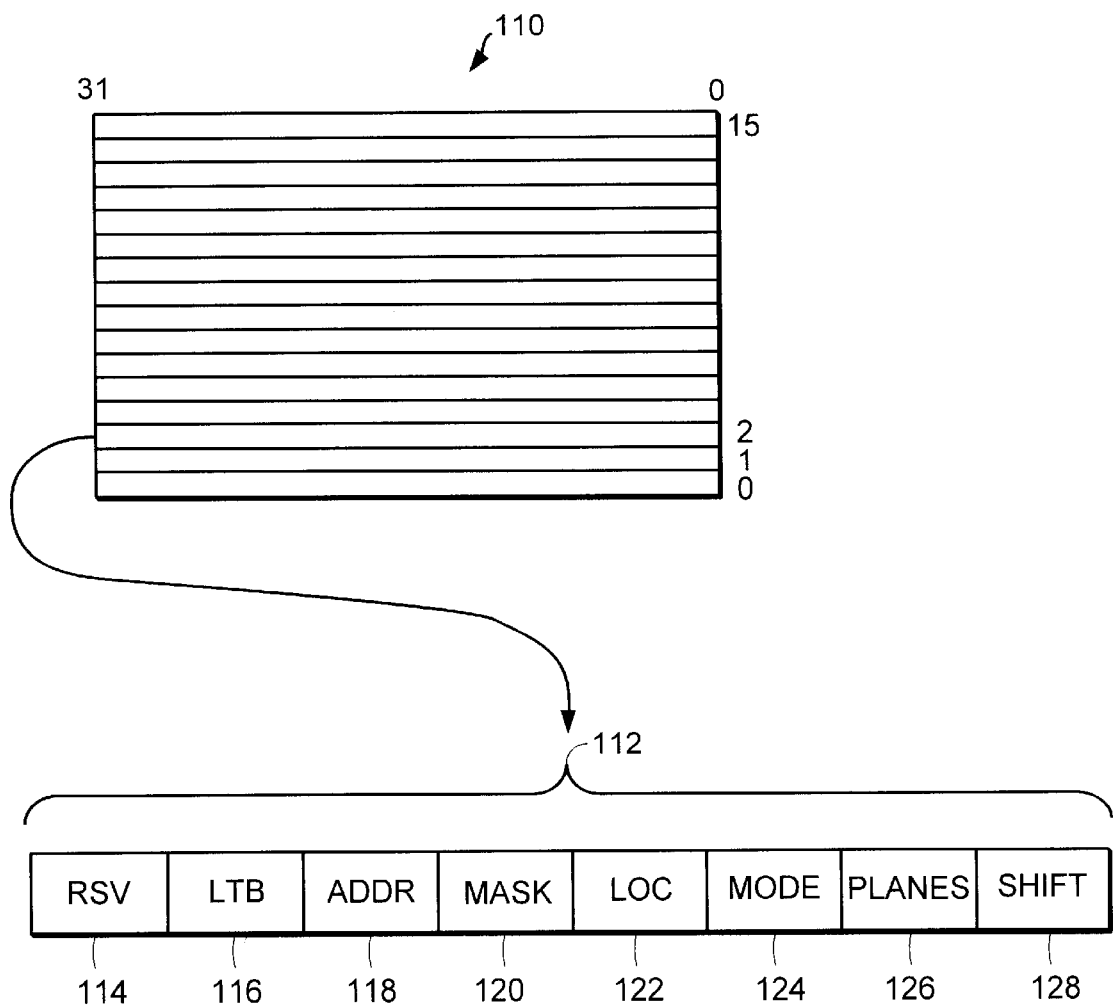
FIG. 8A shows an example embodiment of a pixel interpretation table.

FIG. 8A shows an example embodiment of a pixel interpretation table 110. FIG. 8A further shows an example format of a pixel interpretation table entry 112. The example pixel interpretation table 110 in FIG. 8A includes 16 entries having associated indexes of zero through 15. The example pixel interpretation table entry 112 is shown including a Reserved field 114, a Look-up Table Bypass (LTB) bit 116, Start Address field 118, a Mask field 120, an Overlay Data Location field 122, a Mode field 124, a Planes field 126, and a Shift field 128.

During operation of the example embodiment shown in FIG. 8, the Shift field 128 specifies a bit position where color information begins for that pixel. The contents of this field are used by the present system to select 8-bit sub-fields of the color information from the pixel value to index into the color look-up tables of the RAMDAC.

The value of the Planes field 126 indicates the number of bits used for color information. The value of the mode field 124 further controls how the color information within the pixel value is used. For example, the value of the mode field 124 determines whether the color information in the pixel value is used in "true color" or a "pseudo color" mode. If the value of the mode field 124 indicates that the color information is to be used to generate true color, then an equal number of bits from the color information are used for obtaining color values for each of the red, green, and blue color guns. For example, in true color mode where the value of the planes field 126 is 24, the color information is used as three 8-bit quantities. In that case the value of each 8-bit sub-field in the color information is used to index a predetermined one of the color look up tables in order to generate a value to send to an associated color gun.

If the mode field value indicates that the color data is to be used to generate pseudo color, then color values for all three color guns are obtained using a single set of bits from within the color information in the pixel. The value of the shift field 128 is used to select one of the three 8-bit sub-fields within the 24-bits of color information to generate the display of that pixel. The value of the selected 8-bit sub-field is used as an index into each of the color look-up tables in order to generate the voltage values to send to the associated color guns.

The disclosed system operates in pseudo color mode. To provide a blinking object, the driver in the disclosed system manipulates the shift field contents to change the sub-field of the color information in the pixel value that is used to generate the color of a pixel. Blinking is for example accomplished as follows: first, the lower 8 bits of the color information are used for color generation. After a user specified period of time, the shift value is updated by the device driver so that the middle 8 bits are used to generate the color. After a subsequent predetermined time period, the first 8 bits are again used to generate the color of the pixel in the blinking object.

The disclosed system's selection of alternating sub-fields within the color information of a pixel by modifying entries in the pixel interpretation table is in distinct contrast with existing systems, in which the values of the pixel interpretation table entries are loaded initially and never modified.

The Overlay Location field 122 specifies the bit location of overlay data within the pixel value. For example, a first predetermined value in the Overlay Location field 122 indicates that an overlay value is located in the four most significant bits after the color information in the pixel value.

The value of the Overlay Mask field 120 is used to enable (logic 1) or disable (logic 0) the corresponding bits within the overlay data in the pixel values. The overlay data is logically "AND"ed with the mask 120 value to produce the final results. By using the value of the mask field 120, overlay data may be present in memory, but made transparent by clearing the mask bits in the associated pixel interpretation entries.

The value of the overlay mask field is used by the RAMDAC to mask individual bits of the overlay data in the pixel value. Responsive to each pixel value read from the VRAM, the overlay mask in the associated pixel interpretation table entry is logically "AND"ed with the overlay data in the pixel value. The result is then used to index into an overlay portion of the color tables for each color gun. For example, the overlay portion of each color table is a 16-entry table located in addresses below the starting address of the color table. Accordingly, when the result of the AND operation is non-zero, the location of the overlay color information is determined by subtracting the size of the overlay color table from the starting address of the color table, and then adding the result of the logical "AND" operation.

If the result of the logical "AND" operation is zero, then the overlay is transparent. Accordingly, when there is an overlay mask value of "0" in a pixel interpretation table entry associated with a pixel value, the overlay data for that pixel value is ignored, and the color information for display of that pixel is obtained from the non-overlay color information in the pixel value.

In an example embodiment, the application program is responsible for writing the pixel values for the current and all history positions of a tracked object. The application indicates which pixels are within a current position of a tracked object, and which pixels are within a history position of a tracked object by including a pixel interpretation table index in each pixel value that is selected from a set of predetermined pixel interpretation table indices. Further in this example embodiment, the device driver manipulates the values of the overlay mask field in the pixel interpretation table entries corresponding to the set of predetermined pixel interpretation indices in order to always display the current position of each tracked object, and to sequentially display the history positions of each tracked object. The application program is responsible for turning off pixels in history positions of tracked objects which are no longer to be displayed.

The value of the Starting Address field 118 specifies a base address of a specific color map within each color lookup table. Color information, including overlay data in each pixel value addresses the specified color map independently of the absolute physical address of the color map within the color lookup table. The Start Address 118 is, for example, added to the non-overlay color information in the pixel value then multiplied by a predetermined entry size to generate the physical address within the color lookup table containing the intensity value for the corresponding color gun for that pixel.

A first predetermined value of the LTB bit 116 indicates that color data is sent directly to the electron guns bypassing the color look-up tables (90, 92 and 94). When this bit indicates that color data from the pixel is to be sent directly to the electron guns, and the mode bit indicates 24-bit "true color" mode, values from each of the one byte sub-fields in the color data are applied to the blue, green and red guns. In 8-bit "pseudo-color" mode, a single 8-bit value from the color data (indicated by the value of the shift field) is applied equally to the red, blue and green electron guns to produce a 256 shade Grey scale.

The present system dynamically modifies the entries in the pixel interpretation table to produce blinking or tracked pixel displays. In an example embodiment, the pixel interpretation table 110 is 16 entries long of which 10 are used to implement blinking or tracked pixels. The pixel interpretation table entry indexes used by the present system to provide blinking or tracked pixels are, for example, between two and eleven inclusive. The following list summarizes a first example embodiment of the disclosed pixel interpretation table:

Pixel Interpretation

| Table Entry Index | Description |
| --- | --- |
| 2 | Indicates that the associated pixel is within a blinking object. The device driver modifies the shift field value in this entry to provide the blinking effect. |
| 3 | Indicates that the associated pixel is within the current position of a tracked object. The device driver leave the overlay mask field unmodified, and as a result, the pixel is displayed based on any overlaying data in the pixel value. For example, the overlay mask field value is all 1s, or $f_{16}$. |
| 4 | Indicates that the associated pixel is within the most recent tracked position of a tracked object, for example, at time T-1. |
| 5 | Indicates that the associated pixel is within the second most recent tracked position of a tracked object (T-2). |
| 6 | Indicates that the associated pixel is within the third most recent tracked position of a tracked object (T-4). |
| 7 | Indicates that the associated pixel is within the fourth most recent tracked position of a tracked object (T-4). |

-continued

| Table Entry Index | Description |
| --- | --- |
| 8 | Indicates that the associated pixel is within the fifth most recent tracked position of a tracked object (T-5). |
| 9 | Indicates that the associated pixel is within the sixth most recent tracked position of a tracked object (T-6). |
| 10 | Indicates that the associated pixel is within the seventh most recent tracked position of a tracked object (T-7). |
| 11 | Indicates that the associated pixel is within a previous position of a tracked object that is no longer to be tracked. The overlay mask is, for example, set to zero, causing any overlay data in the pixel value to be ignored. |

Figure 8B:
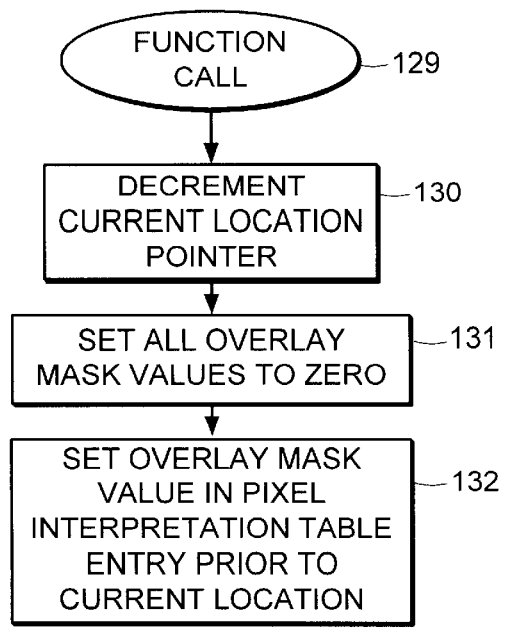
FIGS. 8B and 8C are flow charts showing steps performed in an example embodiment to display a tracked object.

In a second example embodiment of the disclosed pixel interpretation table, those entries having indices 3 through 10 are used to maintain pixels within the current location of the tracked object as well as within tracked previous locations on a rotating basis. For example, as shown in FIG. 8B, the application program calls a function 129 which notifies the device driver to update a current location pointer indicating which of Pixel Interpretation Table entries 3 through 10 should be treated as the entry for pixels within the current location of the tracked object. the device driver responds as shown at step 130 by decrementing the current location pointer. The current location pointer is set to 10, if the decremented value would be less than 5. In this way, the entries 3 through 10 are treated as a sequential ring, wrapping around such that entries 2 and 10 are sequentially adjacent.

For example, the current location pointer is initially set to 3, indicating Pixel Interpretation Table Entry 3. Entries 4 through 10 are initially used to display pixels in tracked previous locations of the tracked object with entry 4 associated with pixels in location T-1, entry 5 associated with pixels in location T-2, etc. After step 130 is performed, the new current location pointer value is 10. Entries 3 through 9 are then used to display pixels in tracked previous locations of the tracked object, with entry 3 associated with pixels in the new location T-1 (the former current location), entry 4 associated with pixels in the new location T-2, and so on. After a subsequent call to the function 129, the device driver again decrements the current location pointer such that it contains a value of 9. At that point, the entries 10, 1, 2, 3, 4, 5, 6, 7, and 8 are used to display pixels in tracked previous locations of the tracked object, with entry 10 associated with pixels in the new location T-1, entry 1 associated with pixels in the new location T-2, and so on with entry 7 associated with the least recent tracked previous position of the tracked object.

Further in the example embodiment of FIG. 8B, at step 131, the device driver sets all the overlay mask values in those pixel interpretation table entries associated with tracked previous positions of the tracked object to zero, and sets the overlay mask value in the pixel interpretation table entry associated with the current position of the tracked object to all ones. At step 132, the device driver sets the overlay mask values in the pixel interpretation table entry sequentially prior to the entry associated with the current position to all ones. In this way, the least recent tracked previous position of the tracked object is displayed initially along with the current position. The previous tracked positions are then displayed sequentially in order towards the current position.

For example, if after step 130 the new current position pointer has a value equal to 9, then at step 132, the device driver sets the overlay mask value in entry 3 to all ones, since entry number 8 is associated with pixels in the least recent tracked previous position of the tracked object.

Where the first example embodiment of the pixel interpretation table is used, the application writes into the index fields of each pixel value in a current or tracked previous position of the tracked object when the object changes position. Where the second example embodiment of the pixel interpretation table is used, the application writes the index value of pixels in the new current position of the tracked object with the index immediately preceding the old index for pixels in the current position of the tracked object. For example, where the current position of a tracked object is initially indicated by an index value of 3, the application writes a value of 10 into the index field within the pixel value of pixels within the new position of the tracked object, and calls the function or service 129 to direct to the device driver to update the value of its current position pointer. In this way, the second example embodiment of the Pixel Interpretation Table eliminates the need for the application to modify the values of pixels in tracked previous positions of the tracked object when the tracked object changes position.

When either the first or second example embodiment of the Pixel Interpretation Table is used, the application explicitly turns off pixels outside the tracking scope as the tracked object moves. For example, when the application writes a tracked object into a new position, it writes pixels in the least recent former tracked position of the object (former T-7, for example) with an index value of 11. Since the overlay mask value in entry 11 within in the pixel interpretation table is initialized to and remains zero, this effectively erases those pixels from being displayed.

Another feature of the disclosed system is that because all tracked objects are displayed using overlay data in the pixel values, the application can conveniently erase all tracked objects by simply modifying the overlay mask field, in the pixel interpretation table entries to be equal to zero.

Figure 8C:
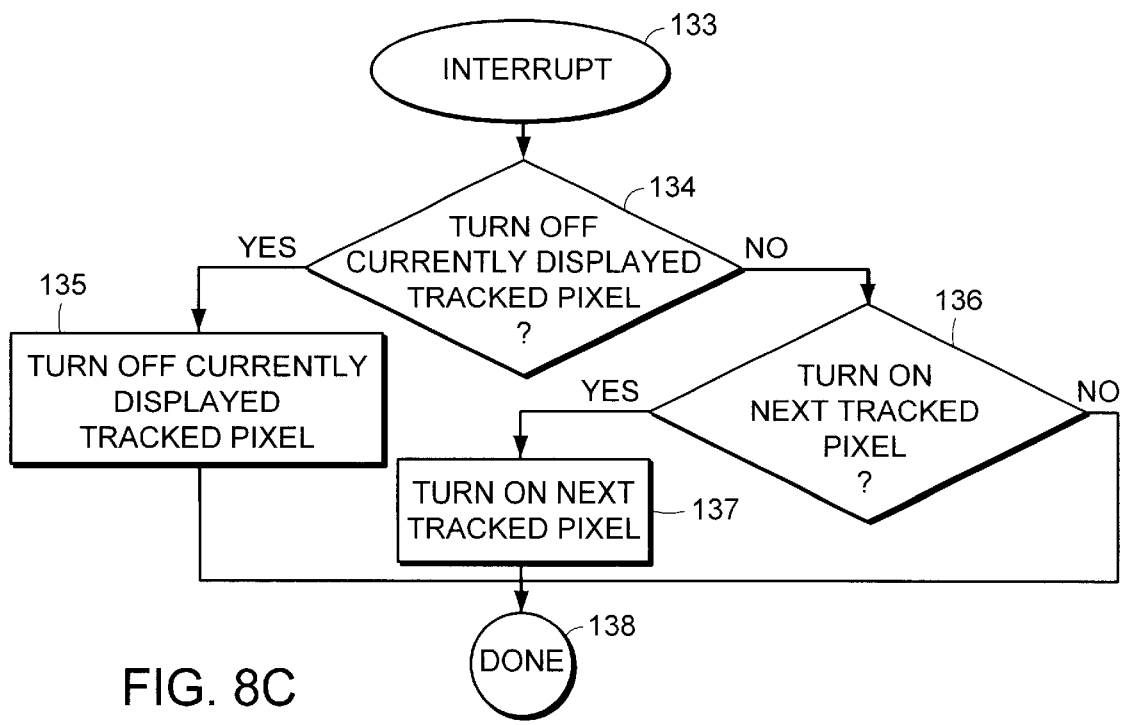

FIG. 8C shows an example of steps periodically performed by the device driver to provide display of tracked objects.

Responsive to an interrupt 133, for example a VBI (Vertical Blanking Interrupt), the device driver at step 134 determines whether a currently displayed tracked previous position of the tracked object should be turned off. For example, the device driver may maintain a counter (FRAMES_ON) which represents the number of interrupts which may be received following a tracked previous position being turned on before pixels in that tracked previous position are turned off. Such a counter is, for example, based on configuration parameters provided by a user or application program. For example, if at step 134 the device driver decrements the FRAMES_ON counter and the resulting value is zero, then step 134 is followed by step 135. Otherwise, step 134 is followed by step 136. If the counter value is zero before the decrement, then step 134 is followed by step 136.

At step 135, the device driver writes a zero into the overlay mask value of the pixel interpretation table entry associated with a displayed tracked previous position of tracked object. The device driver further updates a pointer (DISPLAY_TRACK) indicating which pixel interpretation table entry is associated with a tracked previous position of the tracked object to be displayed. This pointer is, for example, updated to indicate the entry next most recent in time relative to the entry associated with the current position of the tracked object. If the last value of the pointer was to the entry associated with the most recent tracked previous position (T-1), then the pointer is updated to indicate the formerly least recent tracked previous position (T-7, for example). Further, at step 135, a counter representing the number of interrupts to be received before pixels in the next most recent tracked previous position of the tracked object are to be turned on is set to its initial value (FRAMES_OFF).

At step 136, the device driver determines whether the next tracked previous position of the tracked object should be turned on. For example, the device driver decrements FRAMES_OFF and if the result after the decrement is zero, then the device driver writes all ones into the overlay mask fields of the pixel interpretation table entry indicated by the DISPLAY_TRACK pointer at step 137. Otherwise, step 136 is followed by step 138.

Figure 9:
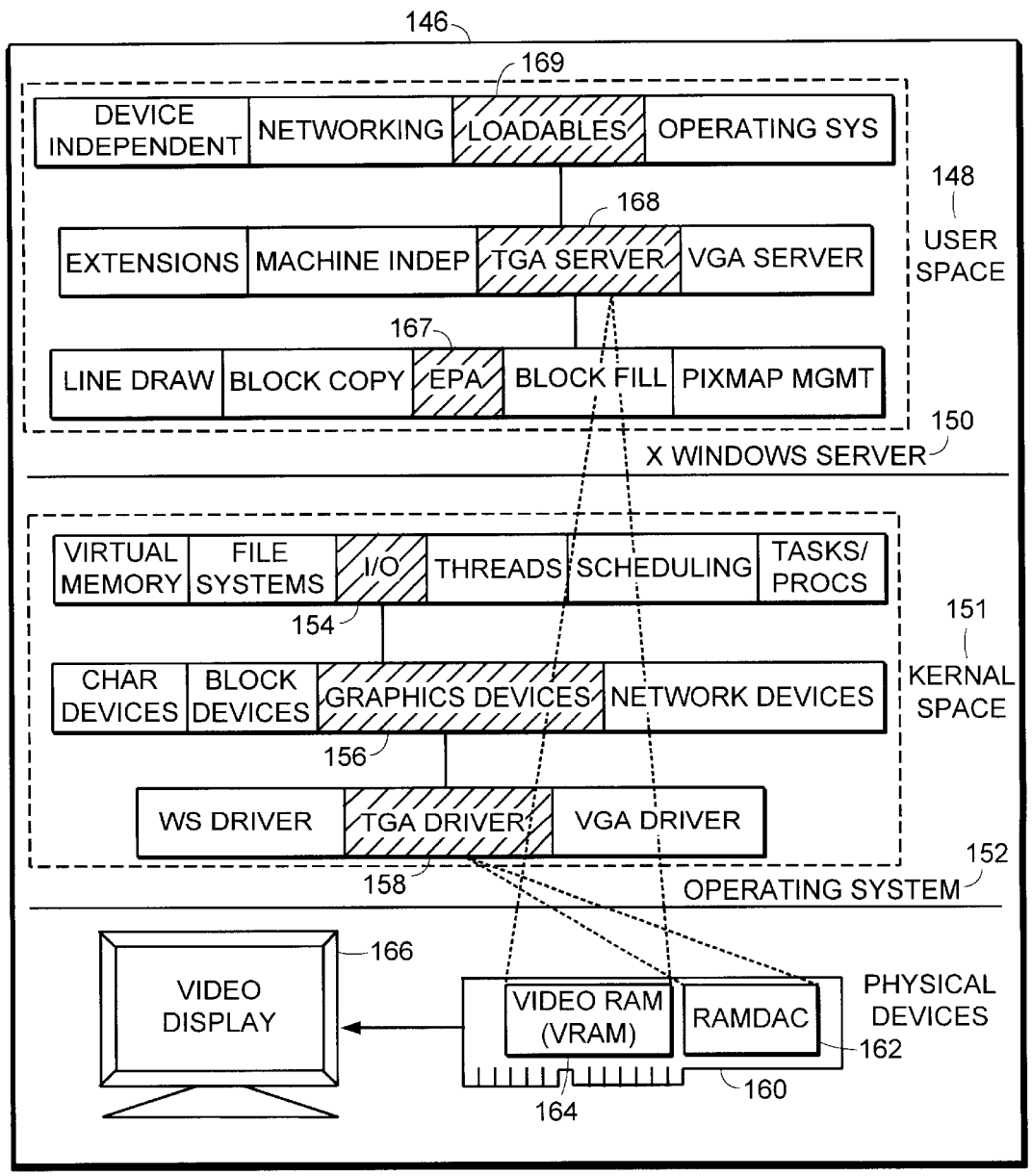
FIG. 9 shows an example embodiment of a graphics display system.

FIG. 9 shows an example embodiment of the present system including components within a graphics windows server 150 software system resident in a user space 148 portion of a virtual address space. The user space 148 for example includes application specific programs. The example embodiment of FIG. 9 further shows components resident within a system or "kernel" space 151 having an operating system 152, for example a device driver 158.

Further shown in user space 148 are loadable code modules 169, a graphics server module 168 within the loadable code modules 159, and an "Extended Pixel Attributes" (EPA) application interface 167 within the graphics server 168. Further shown in the kernel space 151, are an I/O subsystem 154, including device drivers 156 for any graphics devices, for example graphics device driver 148.

During operation of the elements shown in the example embodiment of FIG. 9, the graphics server 168 reads and writes the contents of the VRAM 164 within the graphics adapter 160 responsive to commands received from a user or application program. For example, where the disclosed system is used to display objects detected by a radar system, the elements within the X-Windows server 150 are used to write the contents of the VRAM 164 to reflect what is detected by the radar system. The graphics server module 168 accordingly provides graphics primitive interfaces which may be used by the radar system to draw blinking or tracked objects to specific locations in the display space for display on the display device 166. Further during operation of the elements shown in FIG. 9, the driver 158 controls the operation of the RAMDAC 162. The graphics adapter 160 operates the video display device 166.

In the example embodiment of the elements shown in FIG. 9, the device driver 158 includes four areas of functionality. These are as follows:

1. Code performing initialization on the graphics adapter 160.

2. Code mapping the VRAM 164 into user space so that the server 150, which runs as a user level process, can access it through the graphics server module 168. The server 150 in this way is enabled to perform drawing onto the video display 166 by writing pixel values into the VRAM 164.

3. Code providing an interface from a user level program to the driver 158. This interface is in the form for example of a function or sub-routine call. Any standard mechanism for user level processes to communicate directly with a device driver may be used.

4. Code responding to interrupts from the graphics adapter 160. In an example embodiment, interrupts are generated after every refresh of the video display 166. Such interrupts are, for example, referred to as Vertical Blanking Interrupts, or VBI. For example, typically after each video frame the screen on the video display 166 is erased. During this erase operation the driver 158 may update color tables, pixel interpretation tables, and other parameters of the RAMDAC 162 which may affect the display.

5. Code and data structures determining when pixels within objects displayed on the video display 166 should be blinked or tracked. For both tracking and blinking, the pixel interruption table entries for the affected pixels are modified by the driver 158 during operation. The driver 158 continuously determines whether the values of any pixel interruption table entries have changed within an off line copy of the pixel interruption table,, and downloads any modified pixel tag table entries into the RAMDAC 162 in response to the next interrupt from the graphics adapter 160.

To enable a blinking object, the graphics server module 168 requests a color value to use for drawing a particular color. The disclosed system, for example through the EPA module 167, returns a value in the range of 0 through 255 representing one of 256 possible color look-up table entries to use to draw the color. The returned value is an 8-bit value, and the graphics server module writes the returned value into one of two predetermined sub-fields of the color data in each pixel value for the blinking object.

In an example embodiment, this is accomplished by associating a "plane mask" with the blinking object which masks all writes by the graphics server module 168 of pixel values within the blinking object. For example, the graphics server module 168 may include what is referred to as a "graphics context" associated with a blinking object by a mutually known "object handle" or identifier. Whenever the graphics server module 168 performs a write to pixel values within the blinking object it references a set of data structures associated with that graphics context, including a "plane mask". The plane mask is a binary value, for example, having as many bits a there are bits in a pixel value. Those bits in the plane mask which are set to "1" represent bit positions in the pixel value which can be modified. Bits set to zero are locations in the pixel value which cannot be modified. The plane mask for the graphics context defined for a blinking object defines which of the two predetermined sub-fields of the color data is written with the color value.

For example, an 8-bit color value for "green" is returned as 0×12. The server sets the value of a variable to be 0X00000012. The graphics server module 168 replicates (for example by shifting) the value into the next most significant byte to generate a pixel value equal to 0X00001212. The graphics server 168 also sets the pixel interpretation table index value. The default pixel interpretation table entry for blinking objects is '2'. This results in a variable value of 0X20001212. This resulting value is the value subsequently used by the server 168 to write pixel values in the VRAM for any green object, blinking or non-blinking. For example, to write a pixel value for a non-blinking green object, the graphics server module 168 writes a value of 0X20001212 using a graphics context having 0XFFFFFFFF as a plane mask. In this way, the entire value is written into the pixel value. Accordingly, when the first predetermined sub-field (for example bits 0–7) is used to generate the color of the pixel, a value of 0X12 results in green being displayed. And when the second predetermined sub-field of the color data is used, (for example bits 8–15) a value of 0X12 again results in green. Thus a non-blinking green object is provided.

The graphics server 168 initiates the display of a blinking object by associating the object with a graphics context having a plane mask of 0XFFFFFF00. This plane mask value will result in each write by the graphics server module 168 only modifying the upper 24 bits of a pixel value and leaving the contents of the lower 8 bits unchanged. For example, the relative color value for red is "0X14" and the 32-bit pixel value at an arbitrary non-blinking location in VRAM is "0X20001414". After a green pixel within a blinking object is drawn, the new value in memory will be "0X20121214". Note that the lower 8 bits are unchanged as a result of the plane mask in the graphics context for the blinking object. This particular pixel location will now blink between a green pixel and a red pixel.

The device driver 158 continuously updates the pixel interpretation table entry having an index of 2 responsive to the video blanking interrupt. The device driver 158 has two phases of operation. During a first phase, the device driver 158 causes the lower 8 bits (bits 0–7) of the pixel value color information for pixels having a pixel interpretation table index of 2 to be used to generate the color of those pixels. The device driver 158 for example writes a shift value of zero into the pixel interpretation table entry having an index of 2, and a mode value causing the color data in the pixel to be interpreted as 8-bit pseudo color. Accordingly, when the RAMDAC processes the pixel value during the first driver phase, the coordinates of bits 0–7, in this case 0X14, are used to determine the color of the pixel, in this case, red.

During a second phase of operation, the device driver 158 causes the next higher 8 bits (bits 8–15) of the pixel value color information to generate color for pixels having a pixel interpretation index value of 2. The device driver 158 for example writes a shift value of 8 into the pixel interpretation table entry having an index of 2. The mode value is unchanged. Accordingly, when the RAMDAC processes the pixel during the second driver phase, the contents of bits 8–15, in this case 0X12, are used to determine the color of the pixel, in this case, green.

The duration of the driver phases is user reconfigurable. For example, the user may desire a blink rate where each blinking object is displayed for a time period equal to the time during which 12 vertical blanking interrupts are generated. The device driver 158 would then change phases responsive to every twelfth vertical blanking interrupt.

Figure 10:
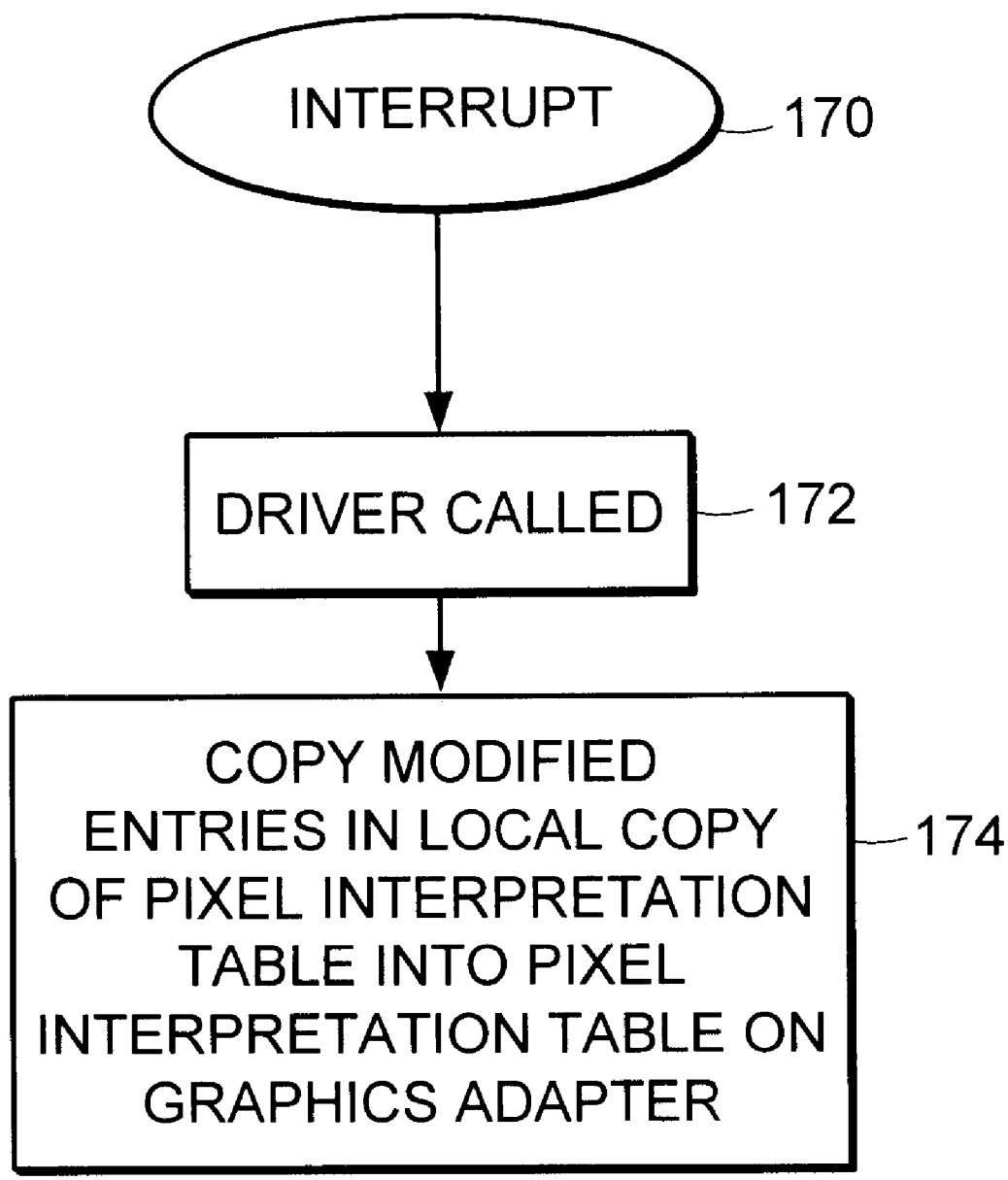
FIG. 10 shows an example embodiment of steps performed by a device driver in response to a pre-determined interrupt.

FIG. 10 shows steps performed by an example embodiment of the present system in response to an interrupt, for example a vertical blanking interrupt 170. In response to the interrupt 170, the device driver is called at step 172. For example, the driver 158 as shown in FIG. 9 would be called at step 172. At step 174, the device driver called at step 172 copies any modified entries in an off-line copy of the pixel interpretation table into the pixel interpretation table located on the graphics adapter which operates the video display device.

As described above, in the new system, the application need only write once to the VRAM for each blinking object, and the single write is the only time the application is involved in the blinking operation. In this way, the present system meets the requirement tracking up to many thousand blinking or tracked objects. While the present system has been described in connection with an X-windows graphics server, the principles of the present system may be applied to any graphics display system.

Further, while the example embodiments have been described in terms of software components or modules, the present system may be implemented in hardware components as well, for example in one or more Application Specific Integrated Circuits (ASICS).

Moreover, while the invention has been described with reference to specific example embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which fall within the true scope of the invention.

What is claimed is:

1. An apparatus for displaying a tracked object on a display device, the apparatus comprising:

a video memory to store a plurality of pixel values in a first plurality of fields, each pixel value in one or more fields having pixel information specifying a characteristic of the tracked object at a pixel location;

a pixel interpretation table having a plurality of entries, each entry interpreting which pixel values in the first plurality of fields should control a display characteristic of the tracked object at that pixel location;

an index value in one of the first plurality of fields specifying an entry in the interpretation table; and means for modifying the plurality of entries of the pixel interpretation table, wherein the modified plurality of entries re-interprets which pixel values in the first plurality of fields should control as to display another characteristic of the tracked object.

2. The apparatus of claim 1, wherein the entry modifying means include a device driver.

3. The apparatus of claim 1, wherein each entry in the pixel interpretation table comprises a second plurality of fields, and the entry modifying means configured to modify one or more fields to modify the entry.

4. The apparatus of claim 3, wherein the pixel value includes a color, and the entry of the pixel interpretation table selects the pixel value in a first field to output a first color in a first frame and selects the pixel value in a second field to output a second color in a subsequent frame after modification of the entries by the entry modifying means.

5. The apparatus of claim 1, wherein the index value indicates to the pixel interpretation table that the tracked object at that pixel location is blinking.

6. The apparatus of claim 1, wherein the index value indicates to the pixel interpretation table that the tracked object at that pixel location is a current object location.

7. The apparatus of claim 1, wherein the index value indicates to the pixel interpretation table that the tracked object at that location is one of a previous tracked location.

8. The apparatus of claim 1, further comprising:

means for modifying the index value in the pixel value.

9. The apparatus of claim 8, wherein the index value modifying means include an application program.

10. The apparatus of claim 3, wherein the pixel information includes overlay data for that pixel location and the entry modifying means enabling/disavling the overlay data by enabling/disabling an overlay mask field in the entry of the pixel interpretation table.

11. A method of displaying a tracked object on a display device, the method comprising the steps of:

storing a plurality of pixel values in a first plurality of fields, each pixel value in one or more fields having pixel information specifying a characteristic of the tracked object at a pixel location;

forming in a pixel interpretation table a plurality of entries, an index value in one of the first plurality of fields specifying an entry in the interpretation table, each entry interpreting which pixel values in the first plurality of fields should control a display characteristic of the tracked object at that pixel location; and modifying the plurality of entries of the pixel interpretation table, wherein the modified plurality of entries re-interprets which pixel values in the first plurality of fields should control as to display another characteristic of the tracked object.

12. The method of claim 11, wherein each entry in the pixel interpretation table comprises a second plurality of fields, the method further comprising the step of modifying one or more fields thereby modifying the entry.

13. The method of claim 12, further comprising the steps of:

storing a color of the tracked object in a plurality of pixel values;

using an entry in the pixel interpretation table to select a pixel value as to displaying a first color in a first frame;

modifying the entry of the pixel interpretation table; and using the modified entry to select another pixel value as to display a second color in a subsequent frame.

14. The method of claim 11, wherein the index value indicates to the pixel interpretation table that the tracked object at that pixel location is blinking.

15. The method of claim 11, wherein the index value indicates to the pixel interpretation table that the tracked object at that pixel location is a current object location.

16. The method of claim 11, wherein the index value indicates to the pixel interpretation table that the tracked object at that location is one of a previous tracked location.

17. The method of claim 11, further comprising the step of:

modifying the index value in the index field to point to a different entry point in the pixel interpretation table.

18. The method of claim 12, wherein the pixel information includes overlay data, the method further comprising the steps of:

probiding an overlay mask field in the entry of the pixel interpretation table;

disabling the overlay data by masking the overlay mask field in the entry; and enabling the overlay data by unmasking the overlay mask field in the entry.

19. A processor executable medium containing instructions therein for displaying a tracked object on a display device, which when executed by a processor causes the processor to execute a method comprising the steps of:

storing a plurality of pixel values in a first plurality of fields, each pixel value in one or more fields having pixel information specifying a characteristic of the tracked object at a pixel location;

forming in a pixel interpretation table a plurality of entries, an index value in one of the first plurality of fields specifying an entry in the interpretation table, each entry interpreting which pixel values in the first plurality of fields should control a display characteristic of the tracked object at that pixel location; and modifying the plurality of entries of the pixel interpretation table, wherein the modified plurality of entries re-interprets which pixel values in the first plurality of fields should control as to display another characteristic of the tracked object.

20. The processor executable medium of claim 19, wherein each entry in the pixel interpretation table comprises a second plurality of fields, the method further comprising the step of modifying one or more fields thereby modifying the entry.

21. The processor executable medium of claim 20, further comprising steps of:

storing a color of the tracked object in a plurality of pixel values;

using an entry in the pixel interpretation table to select a pixel value as to displaying a first color in a first frame;

modifying the entry of the pixel interpretation table; and using the modified entry to select another pixel value as to display a second color in a subsequent frame.

22. The processor executable medium of claim 19, wherein the index value indicates to the pixel interpretation table that the tracked object at that pixel location is blinking.

23. The processor executable medium of claim 19, wherein the index value indicates to the pixel interpretation table that the tracked object at that pixel location is a current object location.

24. The processor executable medium of claim 19, wherein the index value indicates to the pixel interpretation table that the tracked object at that location is one of a previous tracked location.

25. The processor executable medium of claim 19, further comprising the step of:

modifying the index value in the index field to point to a different entry point in the pixel interpretation table.

26. The processor executable medium of claim 20, wherein the pixel information includes overlay data, the method further comprising the steps of:

providing an overlay mask field in the entry of the pixel interpretation table;

disabling the overlay data by masking the overlay mask field in the entry; and enabling the overlay data by unmasking the overlay mask field in the entry.

* * * * *